United States Patent
Kigure et al.

(10) Patent No.: US 12,276,675 B2
(45) Date of Patent: Apr. 15, 2025

(54) INERTIAL SENSOR AND INERTIAL MEASUREMENT UNIT

(71) Applicant: SEIKO EPSON CORPORATION, Tokyo (JP)

(72) Inventors: Shota Kigure, Matsumoto (JP); Yoshiyuki Matsuura, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/833,053

(22) Filed: Jun. 6, 2022

(65) Prior Publication Data

US 2022/0404389 A1   Dec. 22, 2022

(30) Foreign Application Priority Data

Jun. 17, 2021   (JP) .................................. 2021-100704

(51) Int. Cl.
*G01P 15/125*   (2006.01)
*G01P 15/02*   (2013.01)
*G01P 15/08*   (2006.01)

(52) U.S. Cl.
CPC ............ *G01P 15/125* (2013.01); *G01P 15/02* (2013.01); *G01P 15/0802* (2013.01); *G01P 2015/0817* (2013.01)

(58) Field of Classification Search
CPC ............... G01P 15/125; G01P 15/0802; G01P 2015/0817; G01P 2015/0831; G01P 15/02
See application file for complete search history.

(56) References Cited

U.S. PATENT DOCUMENTS

| | | | | |
|---|---|---|---|---|
| 6,272,926 B1* | 8/2001 | Fehrenbach | .......... | B81B 3/0051 |
| | | | | 73/514.32 |
| 6,360,605 B1* | 3/2002 | Pinter | .................. | B81B 3/0051 |
| | | | | 73/514.32 |
| 2004/0129077 A1* | 7/2004 | Franz | ..................... | G01P 15/08 |
| | | | | 73/652 |
| 2008/0196497 A1* | 8/2008 | Suzuki | .................. | G01C 19/56 |
| | | | | 73/504.02 |
| 2013/0192370 A1 | 8/2013 | Yoda | | |
| 2014/0338450 A1* | 11/2014 | Classen | ................ | G01P 15/125 |
| | | | | 73/514.32 |
| 2015/0013458 A1* | 1/2015 | Tanaka | .................. | B81B 3/0051 |
| | | | | 73/514.35 |

(Continued)

FOREIGN PATENT DOCUMENTS

| | | |
|---|---|---|
| JP | 2013-156121 | 8/2013 |
| JP | 2018-021920 | 2/2018 |

(Continued)

*Primary Examiner* — Helen C Kwok
(74) *Attorney, Agent, or Firm* — Rankin, Hill & Clark LLP

(57) ABSTRACT

An inertia sensor detects a physical quantity based on a displacement in a Z axis when three axes orthogonal to one another are defined as an X axis, a Y axis, and the Z axis. The inertial sensor includes: a substrate; and a movable body that is fixed to the substrate, that swings around a swing axis P along the X axis, and that has two flat surfaces facing each other and a side surface connecting the two flat surfaces. The movable body includes a first extension arranged at a predetermined angle with respect to the swing axis P and a second extension arranged facing the side surface of the first extension.

11 Claims, 6 Drawing Sheets

(56) References Cited

U.S. PATENT DOCUMENTS

| | | | |
|---|---|---|---|
| 2015/0020591 A1* | 1/2015 | Tanaka | G01P 15/125 |
| | | | 73/514.32 |
| 2015/0053002 A1 | 2/2015 | Ullrich et al. | |
| 2015/0096378 A1* | 4/2015 | Kigure | G01P 1/003 |
| | | | 73/514.32 |
| 2015/0268268 A1* | 9/2015 | Liu | G01P 15/125 |
| | | | 73/514.32 |
| 2015/0316582 A1* | 11/2015 | Tanaka | G01P 15/125 |
| | | | 73/514.32 |
| 2018/0252744 A1* | 9/2018 | Kamada | G01P 15/18 |
| 2018/0275159 A1 | 9/2018 | Kanamaru et al. | |
| 2018/0275163 A1* | 9/2018 | Tanaka | G01P 15/125 |
| 2019/0002274 A1* | 1/2019 | Cardanobile | B81B 3/007 |
| 2019/0063924 A1* | 2/2019 | Tanaka | G01C 19/5769 |
| 2019/0094262 A1 | 3/2019 | Ito | |
| 2019/0107397 A1 | 4/2019 | Ito | |
| 2019/0162749 A1 | 5/2019 | Furuhata | |
| 2020/0064368 A1* | 2/2020 | Nagata | G01P 15/125 |
| 2020/0241032 A1* | 7/2020 | Nagata | B60W 50/045 |
| 2022/0034935 A1* | 2/2022 | Tanaka | G01P 15/125 |

FOREIGN PATENT DOCUMENTS

| | | |
|---|---|---|
| JP | 2018-146330 | 9/2018 |
| JP | 2019-039804 | 3/2019 |
| JP | 2019-070606 | 5/2019 |
| JP | 2019-100725 | 6/2019 |
| JP | 2019-132593 | 8/2019 |
| JP | 2020-183870 A | 11/2020 |
| WO | 2017/056701 | 4/2017 |

* cited by examiner

INERTIAL SENSOR AND INERTIAL MEASUREMENT UNIT

The present application is based on, and claims priority from JP Application Serial Number 2021-100704, filed Jun. 17, 2021, the disclosure of which is hereby incorporated by reference herein in its entirety.

BACKGROUND

1. Technical Field

The present disclosure relates to an inertial sensor and an inertial measurement unit.

2. Related Art

In recent years, an inertial sensor manufactured using a micro electro mechanical systems (MEMS) technology is developed. As such an inertial sensor, for example, US Patent Application Publication No. 2015/0053002 specification discloses an inertial sensor including: a substrate; a movable body that is arranged on the substrate, that includes first and second detection electrodes, and that swings in a seesaw manner around a rotation axis; and first and second fixed electrodes that are provided on the substrate and that face the first and second detection electrodes, in which an acceleration in a vertical direction is able to be detected based on a change in capacitance generated between the first and second detection electrodes of the movable body that have different rotational moments around the rotation axis from each other and the first and second fixed electrodes that are arranged at positions facing the first and second detection electrodes, respectively.

In addition, the inertial sensor is provided with a damper having a comb structure in order to prevent an operation in an in-plane direction different from a direction in which the acceleration is detected.

However, in the inertial sensor disclosed in US Patent Application Publication No. 2015/0053002 specification, there is a problem that the operation in the in-plane direction is prevented, but an operation of rotating in the in-plane direction is difficult to be prevented.

SUMMARY

An inertia sensor that detects a physical quantity based on a displacement in a Z axis when three axes orthogonal to one another are defined as an X axis, a Y axis, and the Z axis includes: a substrate; and a movable body that is fixed to the substrate, that swings around a swing axis along the X axis, and that has two flat surfaces facing each other and a side surface connecting the two flat surfaces, in which the movable body includes a first extension arranged at a predetermined angle with respect to the swing axis and a second extension arranged facing the side surface of the first extension.

An inertial measurement unit includes: the inertial sensor described above; and a controller that performs control based on a detection signal output from the inertial sensor.

DESCRIPTION OF EXEMPLARY EMBODIMENTS

1. First Embodiment

First, an inertial sensor 1 according to a first embodiment is described with reference to FIGS. 1 and 2 by taking an acceleration sensor that detects an acceleration as a physical quantity in a vertical direction as an example.

Figure 1:
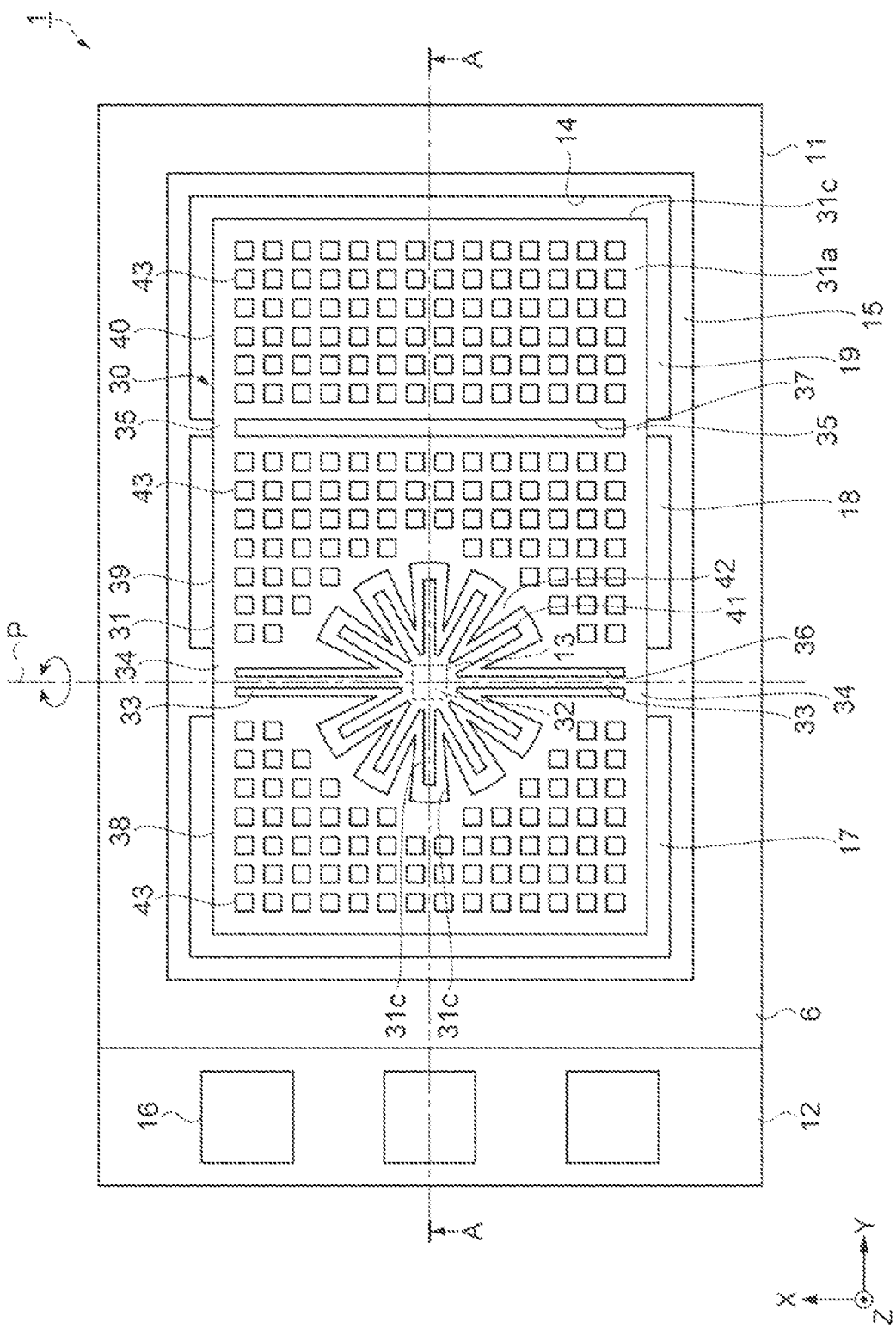
FIG. 1 is a plan view illustrating a schematic structure of an inertial sensor according to a first embodiment.

In FIG. 1, for convenience of illustrating an internal configuration of the inertial sensor 1, a state in which a lid body 21 is removed is illustrated. In FIGS. 1 and 2, illustration of a wiring provided on a substrate 11 is omitted.

For convenience of description, in the following plan view, cross-sectional view, and perspective view, an X axis, a Y axis, and a Z axis are illustrated as three axes orthogonal to one another. Further, a direction along the X axis is referred to as an "X direction", a direction along the Y axis is referred to as a "Y direction", and a direction along the Z axis is referred to as a "Z direction". Further, a tip end side of an arrow in each axial direction is referred to as a "plus side", a base end side is referred to as a "minus side", a plus side in the Z direction is referred to as "upper", and a minus side in the Z direction is referred to as "lower". The Z direction is along the vertical direction, and an XY plane is along a horizontal plane. In the present specification, a plus Z direction and a minus Z direction are collectively referred to as the Z direction.

Figure 2:
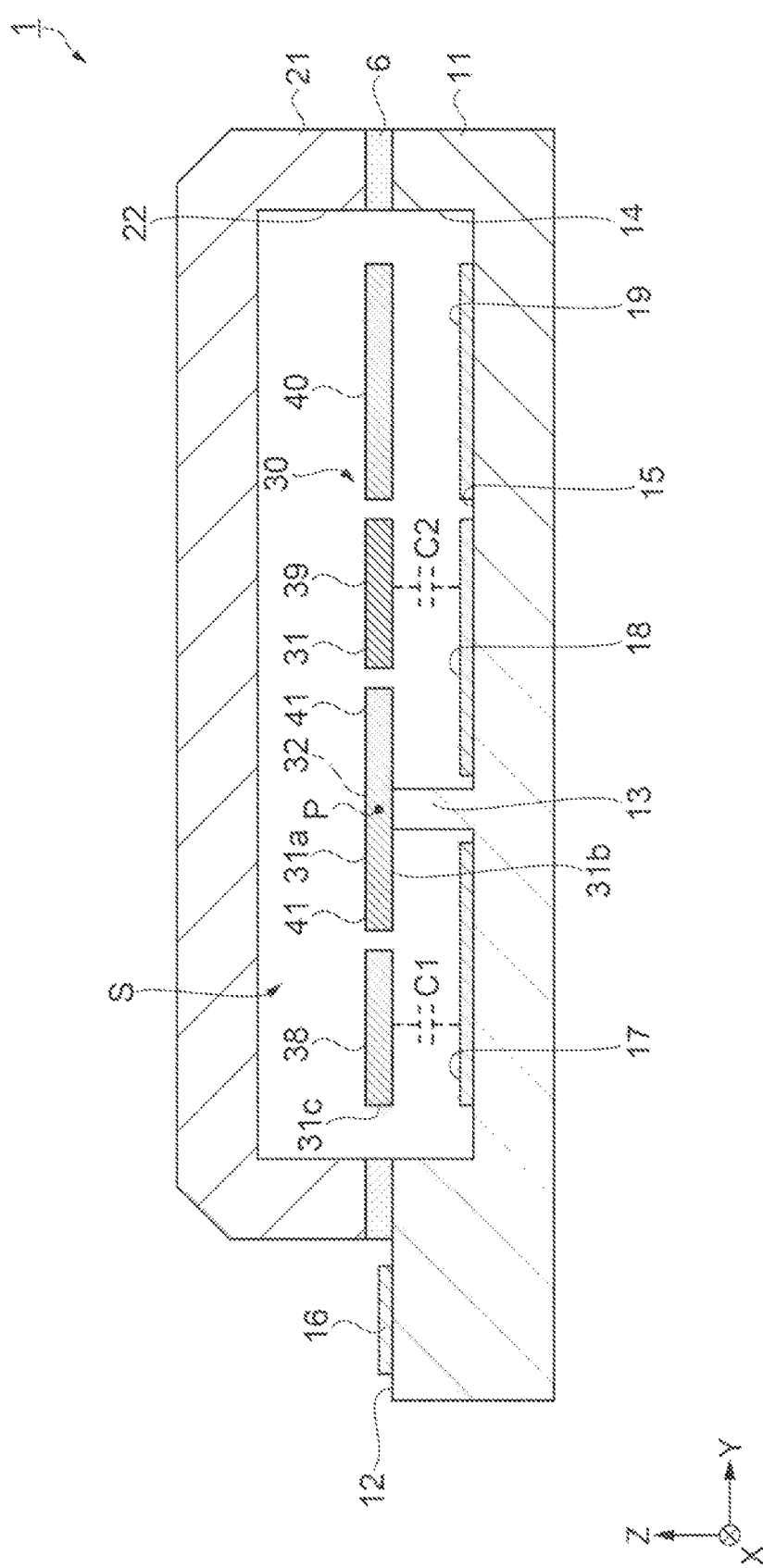
FIG. 2 is a cross-sectional view taken along a line A-A in FIG. 1.

The inertial sensor 1 shown in FIGS. 1 and 2 can detect the acceleration as the physical quantity in the Z direction, which is the vertical direction of a sensor element 30. Such an inertial sensor 1 includes the substrate 11, the sensor element 30 arranged on the substrate 11, and the lid body 21 bonded to the substrate 11 and covering the sensor element 30.

As shown in FIG. 1, the substrate 11 has a spread in the X direction and the Y direction, and has a thickness in the Z direction. Further, as shown in FIG. 2, the substrate 11 is formed with a recess 14 recessed downward from an upper surface 12 of the substrate 11. The recess includes the sensor element 30 inside and is formed larger than the sensor element 30 in a plan view from a Z-axis direction along the Z axis. The recess 14 functions as a clearance for swinging the sensor element 30. The substrate 11 includes a fixer 13 protruding from an inner bottom surface 15 of the recess 14 toward the sensor element 30, and the sensor element 30 is bonded and fixed on the fixer 13. Accordingly, the sensor element 30 can be fixed to the substrate 11 in a state where the sensor element 30 is separated from the inner bottom surface 15 of the recess 14.

A first fixed electrode 17, a second fixed electrode 18, and a third fixed electrode 19 serving as a dummy electrode are arranged on the inner bottom surface 15 of the recess 14. The first fixed electrode 17 and the second fixed electrode 18 have substantially the same area. Each of the first fixed electrode 17 and the second fixed electrode 18 is coupled to a QV amplifier of an external device (not shown), and a capacitance difference thereof is detected as an electric signal by a differential detection method. Therefore, it is desirable that the first fixed electrode 17 and the second fixed electrode 18 have the same area.

The substrate 11 is provided with coupling terminals 16, which electrically couple an external device (not shown) and the first to third fixed electrodes 17, 18, and 19, in a region on the upper surface 12 where the recess 14 is not provided.

As the substrate 11, for example, a glass substrate configured with a glass material containing an alkali metal ion that is a movable ion such as Nat, for example, borosilicate glass such as Pyrex (registered trademark) glass and Tempax (registered trademark) glass can be used. However, the substrate 11 is not particularly limited, and, for example, a silicon substrate or a quartz substrate may be used.

Further, as the first to third fixed electrodes 17, 18, 19 and the coupling terminals 16, metals such as Au, Pt, Ag, Cu and Al, alloys containing these metals, and the like can be used.

As shown in FIG. 2, the lid body 21 is formed at a position where a recess 22 recessed upward overlaps with the recess 14 of the substrate 11. The lid body 21 accommodates the sensor element 30 in the recess 22 and is bonded to the upper surface 12 of the substrate 11 by a glass frit 6 or the like. An internal space S for accommodating the sensor element 30 is formed in an inner side of the lid body 21 and the substrate 11.

The internal space S is an airtight space, and is preferably filled with an inert gas such as nitrogen, helium, or argon to substantially have an atmospheric pressure at an operating temperature of about −40° C. to 125° C. However, an atmosphere of the internal space S is not particularly limited, and may be in, for example, a reduced pressure state or a pressurized state.

As the lid body 21, for example, a silicon substrate can be used. However, the lid body 21 is not particularly limited, and, for example, a glass substrate or a quartz substrate may be used. A method of bonding the substrate 11 and the lid body 21 is not particularly limited, and may be appropriately selected depending on materials of the substrate 11 and the lid body 21. In addition to the bonding by a bonding material such as the glass frit 6, for example, anodic bonding, activation bonding for bonding surfaces activated by plasma irradiation, metal eutectic bonding for bonding metal films formed on the upper surface of the substrate 11 and a lower surface of the lid body 21, and the like can be used.

The sensor element 30 is configured with a movable body 31. The movable body 31 is orthogonal to the Z axis, and has an upper surface 31a and a lower surface 31b that are two flat surfaces having a front and back relationship with each other, and side surfaces 31c that connect the upper surface 31a and the lower surface 31b. As shown in FIG. 1, the movable body 31 has a rectangular shape having a long side in the Y direction in the plan view viewed from the Z direction. The movable body 31 includes a supporter 32 bonded onto the fixer 13, two support beams 33 coupled to the supporter 32 and extending from the supporter 32 to the plus side and the minus side in the X direction, a first movable electrode 38 positioned on the minus side in the Y direction with respect to the support beams 33, a second movable electrode 39 positioned on the plus side in the Y direction with respect to the support beams 33, and a third movable electrode 40 coupled to the second movable electrode 39. The first movable electrode 38, the second movable electrode 39, and the third movable electrode 40 are arranged so as to overlap the first fixed electrode 17, the second fixed electrode 18, and the third fixed electrode 19, which are provided on the inner bottom surface 15 of the substrate 11, in the plan view from the Z direction, respectively. Further, the first to third movable electrodes 38, 39, and 40 of the movable body 31 are provided with a plurality of through holes 43 penetrating the upper surface 31a and the lower surface 31b, and air resistance generated when the movable body 31 is displaced in the Z direction can be reduced.

A first opening 36 is provided between the first fixed electrode 17 and the second fixed electrode 18, and both ends of the first movable electrode 38 and the second movable electrode 39 in the X direction are coupled by a first coupler 34. The first coupler 34 is coupled to the support beams 33 at a center of the first coupler 34. Therefore, when the acceleration along the Z direction is applied, the movable body 31 swings around a swing axis P extending along the X axis while twisting and deforming the support beams 33 with the support beams 33 as the swing axis P. Further, a second opening 37 is provided between the second movable electrode 39 and the third movable electrode 40, and both ends of the second movable electrode 39 and the third movable electrode 40 in the X direction are coupled by a second coupler 35.

Further, since the second movable electrode 39 and the third movable electrode 40 are coupled to each other, which are the movable body 31 positioned on the plus side in the Y direction with respect to the swing axis P, a length thereof in the Y direction is longer than that of the first movable electrode 38, which is the movable body 31 positioned on the minus side in the Y direction with respect to the swing axis P. Therefore, the movable body positioned on the plus side in the Y direction with respect to the swing axis P has a larger area and a larger weight than the movable body 31 positioned on the minus side in the Y direction with respect to the swing axis P in the plan view from the Z direction, and thus has a larger rotational moment than the movable body 31 positioned on the minus side in the Y direction when the acceleration in the Z direction is applied. Due to a difference in the rotational moment, when the acceleration in the Z direction is applied, the movable body 31 swings in a seesaw manner around the swing axis P. The swinging in a seesaw manner means that when the first movable electrode 38 is displaced to the plus side in the Z direction, the second movable electrode 39 is displaced to the minus side in the Z direction, and conversely, when the first movable electrode 38 is displaced to the minus side in the Z direction, the second movable electrode 39 is displaced to the plus side in the Z direction.

When the inertial sensor 1 is driven, a drive signal is applied to the sensor element 30, whereby a capacitance C1 is formed between the first movable electrode 38 and the first fixed electrode 17 and a capacitance C2 is formed between the movable electrode 39 and the second fixed electrode 18. In a natural state where no acceleration is applied, capacitances C1 and C2 are substantially equal to each other.

When the acceleration in the Z direction is applied to the inertial sensor 1, the movable body 31 swings around the swing axis P in a seesaw manner. Due to the swing in a seesaw manner of the movable body 31, a gap between the first movable electrode 38 and the first fixed electrode 17 and a gap between the second movable electrode 39 and the second fixed electrode 18 change in opposite phases, and accordingly, the capacitances C1 and C2 change in the opposite phases from each other. Therefore, the inertial sensor 1 can detect the acceleration in the Z direction based on a difference between capacitance values of the capacitances C1 and C2.

The movable body 31 has the first opening 36 between the first movable electrode 38 and the second movable electrode 39, and the supporter 32 and the support beams 33 are arranged in the first opening 36. With such a shape, a size of the sensor element 30 can be reduced.

In addition, in the first opening 36, as shown in the plan view from the Z direction, a plurality of first extensions 41 extending radially from the supporter 32 toward outer edges of the movable body 31 around the supporter 32 are provided, and the first extensions 41 are arranged at predetermined angles with respect to the swing axis P, respectively. In the present embodiment, ten first extensions 41 extending at angles of ±30°, ±60°, and ±90° respectively with respect to the swing axis P are arranged, but the number is not limited thereto, and may be four or more. In addition, an interval between the first extensions 41 may not be constant.

A plurality of second extensions 42 extending from the first movable electrode 38 and the second movable electrode 39 of the movable body 31 toward the supporter 32 are provided in a periphery of the first opening 36, and the second extensions 42 face the side surfaces 31c of the first extensions 41 and are arranged at a predetermined interval. In the present embodiment, twelve second extensions 42 are arranged between the first extension 41 and the first extension 41 and between the first extension 41 and the support beams 33, but the second extensions 42 are not limited to this, and may be arranged according to the number of the first extensions 41. For example, when the number of the first extensions 41 is four, the number of the second extensions 42 is six, and when the number of the first extensions 41 is six, the number of the second extensions 42 is eight.

Since the side surfaces 31c of the first extensions 41, which are radially arranged around the supporter 32 fixed to the substrate 11, face the side surfaces 31c of the second extensions 42 and are spaced apart from the side surfaces 31c of the second extensions 42 at a predetermined interval, when an in-plane rotation operation around the supporter 32 is applied, air resistance is generated between the rotationally displaced second extensions 42 and the fixed first extensions 41, that is, the air resistance functions as a damper, and the in-plane rotation operation of the movable body 31 can be prevented. In addition, when an excessive in-plane rotation operation is applied, the second extensions 42 come into contact with the fixed first extensions 41 to restrict further displacement of the movable body 31.

The sensor element 30 is formed, for example, by subjecting a conductive silicon substrate doped with an impurity of phosphorus (P), boron (B), arsenic (As) or the like to etching, particularly to vertical processing using a Bosch process that is a deep etching technique.

The inertial sensor 1 of the present embodiment includes the first extensions 41 that extend radially at the predetermined angles with respect to the swing axis P from the supporter 32 fixed to the substrate 11, and the second extensions 42 whose side surfaces 31c face the side surfaces 31c of the first extensions 41 and are spaced apart from the side surfaces 31c of the first extensions 42 at the predetermined interval. Therefore, when the in-plane rotation operation around the supporter 32 is applied, the air resistance is generated between the side surfaces 31c of the rotationally displaced second extensions 42 and the side surfaces 31c of the fixed first extensions 41, that is, the air resistance functions as the damper, and the in-plane rotation operation of the movable body 31 can be prevented.

2. Second Embodiment

Next, a sensor element 30a of an inertial sensor 1a according to a second embodiment will be described with reference to FIG. 3.

The inertial sensor 1a of the present embodiment is the same as the inertial sensor 1 of the first embodiment except that a structure of a movable body 311 of the sensor element 30a is different from that of the inertial sensor 1 of the first embodiment. A difference from the first embodiment described above will be mainly described, and the description of the same matters will be omitted.

Figure 3:
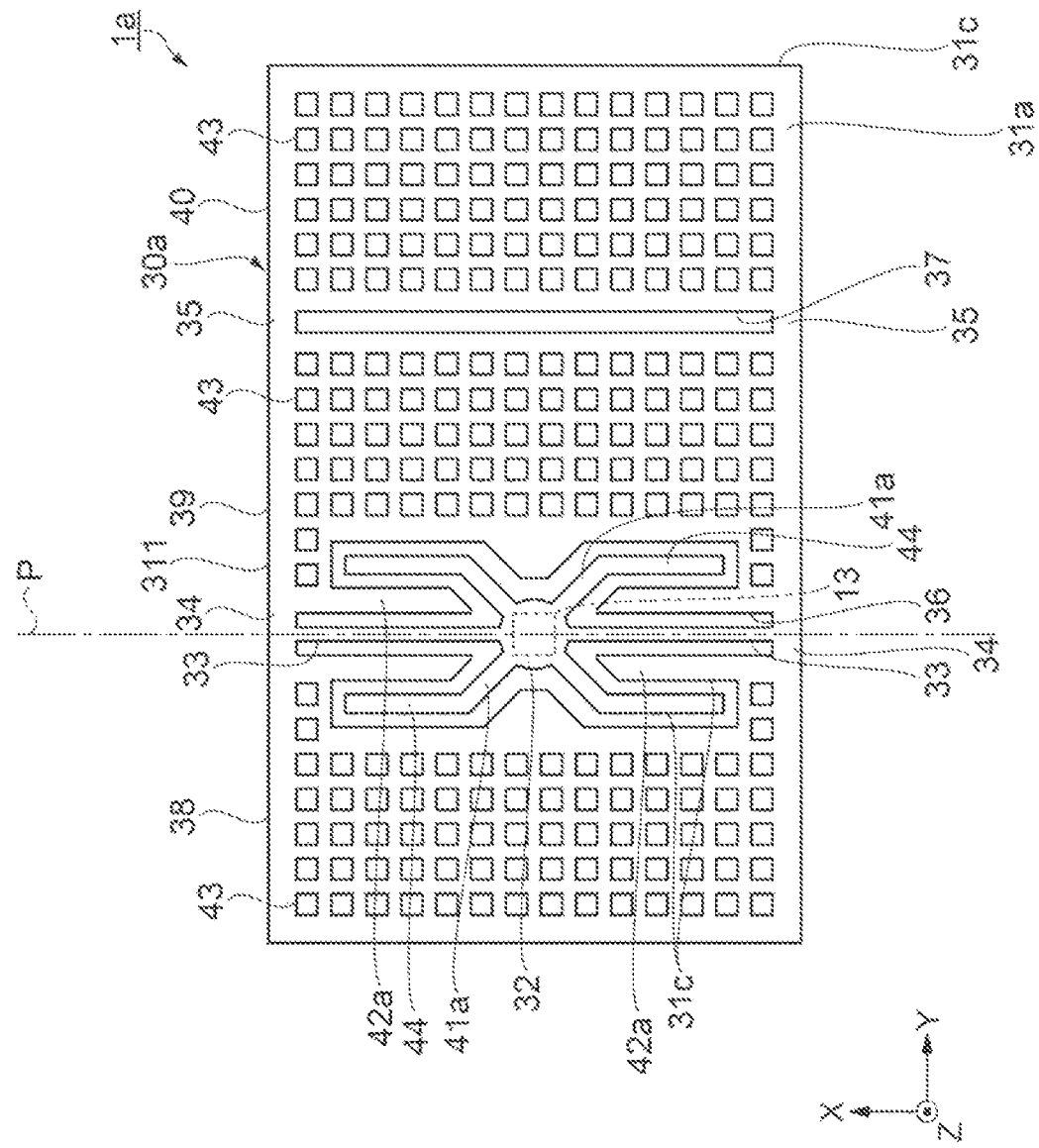
FIG. 3 is a plan view illustrating a schematic structure of a sensor element provided in an inertial sensor according to a second embodiment.

As shown in FIG. 3, in the sensor element 30a, in the first opening 36 of the movable body 311, first extensions 41a coupled to the supporter 32 are arranged at a predetermined angle with respect to the swing axis P (support beams 33), and third extensions 44 parallel to the swing axis P (support beams 33) are provided at tip ends at opposite sides of the first extensions 41a from the supporter 32. A plurality of second extensions 42a extending from the first movable electrode 38 and the second movable electrode 39 of the movable body 311 toward the supporter 32 are provided between the first extensions 41a and the third extensions 44 and the support beams 33.

With such a configuration, the side surfaces 31c of the first extensions 41a and the third extensions 44 face the side surfaces 31c of the second extensions 42a, and thus the configuration functions as a damper for the in-plane rotation operation, and can obtain the same effect as obtained by the inertial sensor 1 of the first embodiment.

3. Third Embodiment

Next, a sensor element 30b of an inertial sensor 1b according to a third embodiment will be described with reference to FIG. 4.

The inertial sensor 1b of the present embodiment is the same as the inertial sensor 1 of the first embodiment except that a structure of a movable body 312 of the sensor element 30b is different from that of the inertial sensor 1 of the first embodiment. A difference from the first embodiment described above will be mainly described, and the description of the same matters will be omitted.

Figure 4:
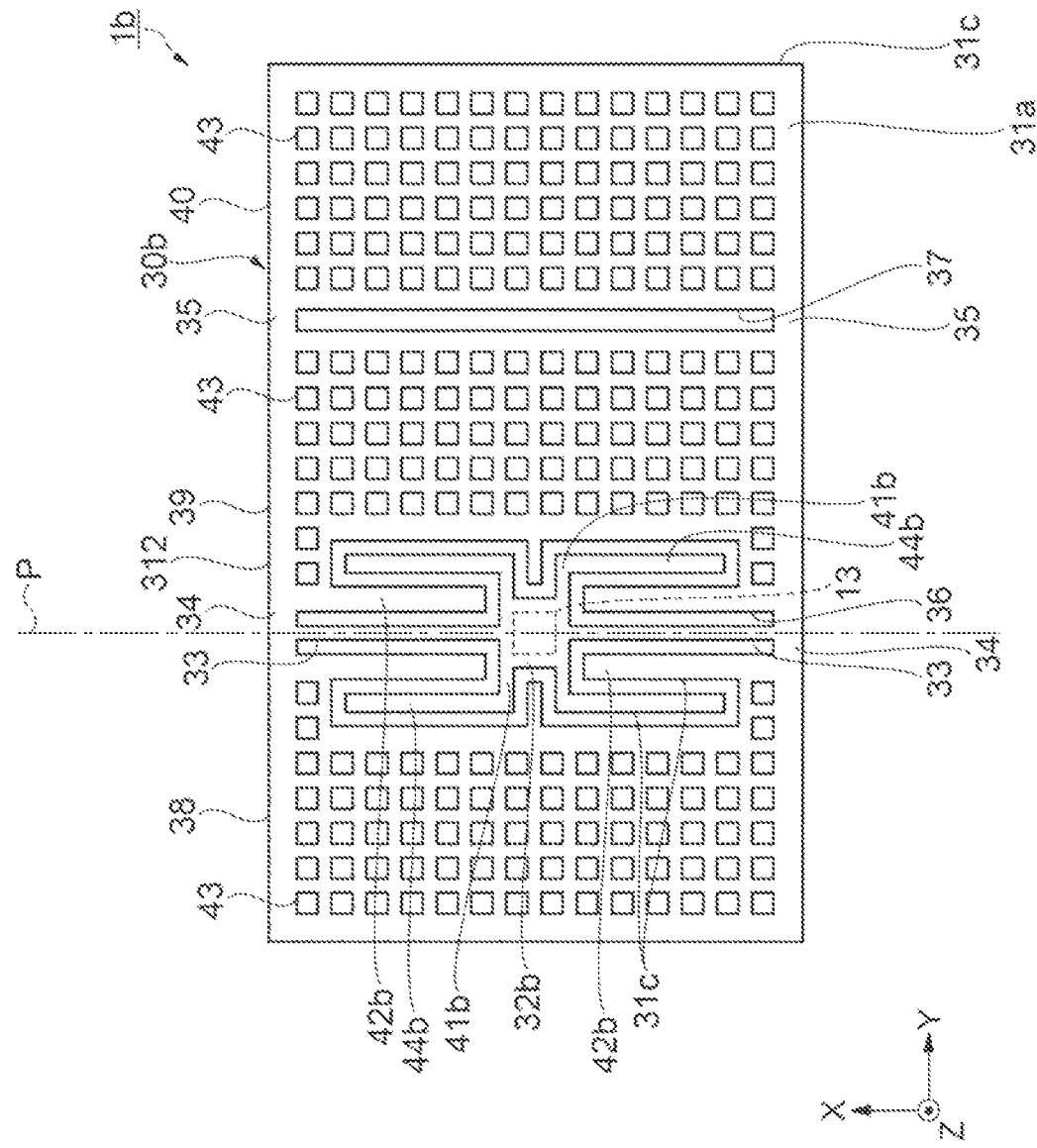
FIG. 4 is a plan view illustrating a schematic structure of a sensor element provided in an inertial sensor according to a third embodiment.

As shown in FIG. 4, in the sensor element 30b, in the first opening 36 of the movable body 312, first extensions 41b coupled to a rectangular supporter 32b extend orthogonally to the swing axis P from the supporter 32b, and third extensions 44b parallel to the swing axis P are provided at tip ends at opposite sides of the first extensions 41b from the supporter 32b. A plurality of second extensions 42b extending from the first movable electrode 38 and the second movable electrode 39 of the movable body 312 toward the supporter 32b are provided between the first extensions 41b and the third extensions 44b and the support beams 33.

With such a configuration, the side surfaces 31c of the first extensions 41b and the third extensions 44b face the side surfaces 31c of the second extensions 42b, and thus the configuration functions as a damper for the in-plane rotation operation, and can obtain the same effect as obtained by the inertial sensor 1 of the first embodiment.

4. Fourth Embodiment

Next, an inertial measurement unit 2000 including the inertial sensors 1 to 1b according to a fourth embodiment will be described with reference to FIGS. 5 and 6. In the following description, a configuration to which the inertial sensor 1 is applied will be described as an example.

Figure 5:
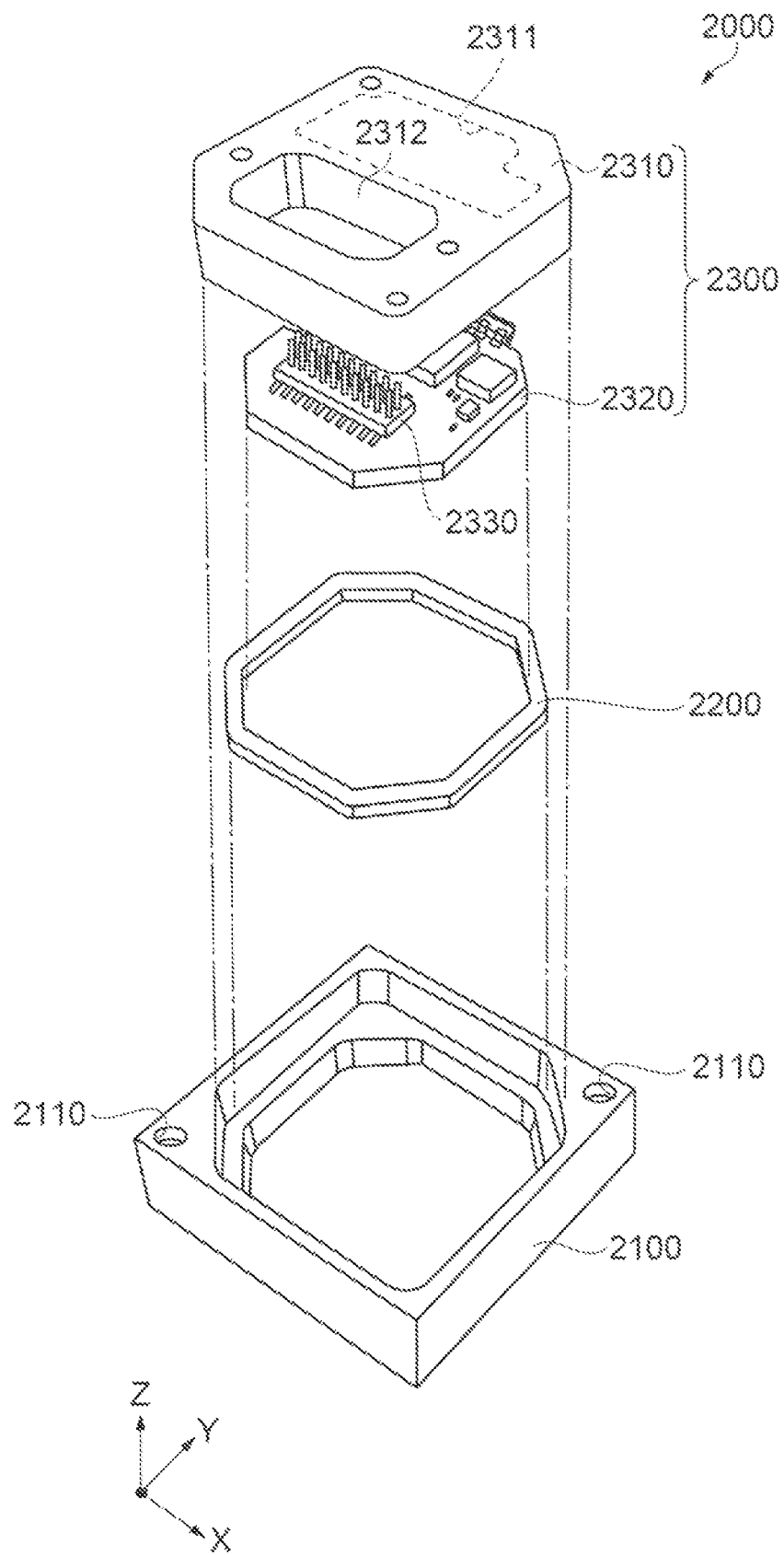
FIG. 5 is an exploded perspective view illustrating a schematic configuration of an inertial measurement unit including an inertial sensor according to a fourth embodiment.

The inertial measurement unit (IMU) 2000 shown in FIG. 5 is a device that detects an inertial motion amount of a posture, a behavior or the like of a moving body such as an automobile or a robot. The inertial measurement unit 2000 functions as a so-called 6-axis motion sensor including an acceleration sensor that detects accelerations Ax, Ay, and Az in directions along three axes, and angular velocity sensors that detect angular velocities ωx, ωy, and ωz around the three axes.

The inertial measurement unit 2000 is a rectangular parallelepiped having a substantially square planar shape. Screw holes 2110 as fixers are formed in the vicinity of two apexes positioned in a diagonal direction of a square. The inertial measurement unit 2000 can be fixed to a mounting target surface of a mounting target body such as an automobile by passing two screws through the two screw holes 2110. A size of the inertial measurement unit 2000 can be reduced by component selection and design change so that the inertial measurement unit 2000 can be mounted in, for example, a smartphone or a digital camera.

The inertial measurement unit 2000 includes an outer case 2100, a bonding member 2200, and a sensor module 2300, and has a configuration in which the sensor module 2300 is inserted inside the outer case 2100 with the bonding member 2200 interposed therebetween. The sensor module 2300 includes an inner case 2310 and a substrate 2320.

Similar to an overall shape of the inertial measurement unit 2000, an outer shape of the outer case 2100 is a rectangular parallelepiped having a substantially square planar shape, and the screw holes 2110 are respectively formed in the vicinity of the two apexes positioned in the diagonal direction of the square. The outer case 2100 has a box shape, and the sensor module 2300 is accommodated inside the outer case 2100.

The inner case 2310 is a member that supports the substrate 2320, and has a shape in which the inner case 2310 is accommodated inside the outer case 2100. The inner case 2310 is formed with a recess 2311 for preventing contact with the substrate 2320 and an opening 2312 for exposing a connector 2330 to be described later. The inner case 2310 is bonded to the outer case 2100 via the bonding member 2200. Further, the substrate 2320 is bonded to a lower surface of the inner case 2310 via an adhesive.

Figure 6:
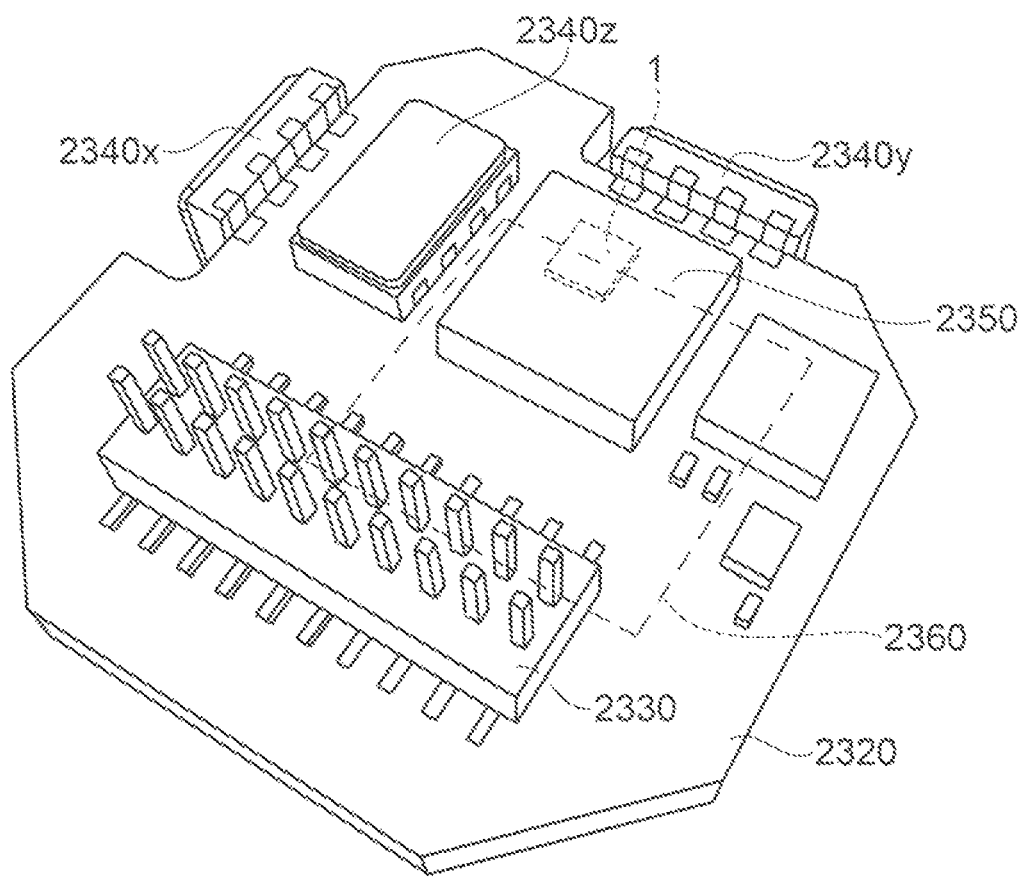
FIG. 6 is a perspective view of a substrate of FIG. 5.

As shown in FIG. 6, the connector 2330, an angular velocity sensor 2340z that detects an angular velocity around the Z axis, an acceleration sensor unit 2350 that detects the acceleration in each axial direction of the X axis, the Y axis, and the Z axis, and the like are mounted on the substrate 2320. Further, an angular velocity sensor 2340x that detects an angular velocity around the X axis and an angular velocity sensor 2340y that detects an angular velocity around the Y axis are mounted on side surfaces of the substrate 2320.

The acceleration sensor unit 2350 includes at least the inertial sensor 1 for measuring the acceleration in the Z direction described above, and can detect the acceleration in one axial direction or accelerations in two axial directions or three axial directions as necessary. The angular velocity sensors 2340x, 2340y, and 2340z are not particularly limited. For example, a vibration gyro sensor using a Coriolis force can be used.

Further, a control IC 2360 is mounted on a lower surface of the substrate 2320. The control IC 2360 as a controller that performs control based on a detection signal output from the inertial sensor 1 is a micro controller unit (MCU), includes a storage including a nonvolatile memory, an A/D converter, and the like, and controls each unit of the inertial measurement unit 2000. The storage stores a program defining an order and a content for detecting the acceleration and the angular velocity, a program for digitizing detection data and incorporating the digitized detection data into packet data, accompanying data, and the like. In addition, a plurality of electronic components other than components described above are mounted on the substrate 2320.

Since such an inertial measurement unit 2000 uses the acceleration sensor unit 2350 including the inertial sensor 1, the inertial measurement unit 2000 having excellent impact resistance and high reliability can be obtained.

What is claimed is:

1. An inertial sensor, comprising:
   a substrate that is orthogonal to a Z axis when three axes orthogonal to one another are defined as an X axis, a Y axis, and the Z axis, and that is provided with a fixed electrode; and
   a movable body that faces the fixed electrode in a Z-axis direction along the Z axis, that is orthogonal to the Z axis, that includes two flat surfaces having a front and back relationship with each other and a side surface connecting the two flat surfaces, and that is provided so as to be swingable with respect to the substrate around a swing axis along the X axis, wherein
   in a plan view from the Z-axis direction along the Z axis, the movable body includes:
      a first extension arranged at a predetermined angle with respect to the swing axis, and
      a second extension arranged so that a side surface of the second extension opposes and faces a side surface of the first extension with an opening of the movable body disposed therebetween,
   in the movable body, a supporter fixed to the substrate is provided, the supporter is arranged in the opening in the plan view from the Z-axis direction, and the supporter is coupled to the movable body by a coupler which spans the opening,
   the first extension is arranged in the opening in the plan view from the Z-axis direction and extends radially from the supporter toward an outer edge of the movable body,
   the second extension is a projection extending from a portion of the movable body defining an outer perimeter of the opening toward the supporter in the plan view from the Z-axis direction, and
   only the opening is disposed between the side surface of the second extension and the side surface of the first extension such that the side surface of the second extension is configured to contact the side surface of the first extension along a length of the first extension and the second extension, respectively, and not at a terminus of the first extension and the second extension, to close, in parallel to an extension direction of the first extension and the second extension, at least a portion of the opening therebetween to restrict displacement of the movable body when a predetermined in-plane rotation is applied, the length of the first extension and the second extension extending along the extension direction, which extends from the portion of the movable body defining the outer perimeter of the opening toward the supporter in the plan view from the Z-axis direction.

2. The inertial sensor according to claim 1, wherein the movable body includes a third extension coupled to a tip end side at an opposite side of the first extension from the supporter, and the side surface of the second extension opposes and faces a side surface of the third extension.

3. The inertial sensor according to claim 2, wherein the third extension is parallel to the X axis.

4. The inertial sensor according to claim 2, wherein the first extension is orthogonal to the X axis, and the third extension is parallel to the X axis.

5. The inertial sensor according to claim 2, wherein the fixed electrode includes a first fixed electrode and a second fixed electrode,
in the plan view from the Z-axis direction, with the swing axis as a boundary, the movable body includes:
a first movable electrode arranged on one side in a Y-axis direction and facing the first fixed electrode,
a second movable electrode arranged on an other side in the Y-axis direction and facing the second fixed electrode,
the coupler coupling the first movable electrode and the second movable electrode, and
a support beam connecting the supporter and the coupler, and
the support beam aligns with the swing axis.

6. An inertial measurement unit comprising:
the inertial sensor according to claim 1; and
a controller that performs control based on a detection signal output from the inertial sensor.

7. The inertial sensor according to claim 1, wherein the predetermined angle is non-parallel to the X axis and the Y axis.

8. The inertial sensor according to claim 7, wherein in the movable body, the supporter fixed to the substrate is provided, and the supporter is arranged in the opening in the plan view from the Z-axis direction,
the first extension is arranged in the opening in the plan view from the Z-axis direction and extends from the supporter toward an outer edge of the movable body, and
the movable body includes a third extension coupled to a tip end side at an opposite side of the first extension from the supporter, and the side surface of the second extension opposes and faces a side surface of the third extension.

9. The inertial sensor according to claim 8, wherein the third extension is parallel to the X axis.

10. The inertial sensor according to claim 8, wherein the fixed electrode includes a first fixed electrode and a second fixed electrode,
in the plan view from the Z-axis direction, with the swing axis as a boundary, the movable body includes:
a first movable electrode arranged on one side in a Y-axis direction and facing the first fixed electrode,
a second movable electrode arranged on an other side in the Y-axis direction and facing the second fixed electrode,
the coupler coupling the first movable electrode and the second movable electrode, the coupler extending in an X-axis direction, and
a support beam connecting the supporter and the coupler, and the support beam aligns with the swing axis.

11. An inertial sensor, comprising:
a substrate that is orthogonal to a Z axis when three axes orthogonal to one another are defined as an X axis, a Y axis, and the Z axis, and that is provided with a fixed electrode; and
a movable body that faces the fixed electrode in a Z-axis direction along the Z axis, that is orthogonal to the Z axis, that includes two flat surfaces having a front and back relationship with each other and a side surface connecting the two flat surfaces, and that is provided so as to be swingable with respect to the substrate around a swing axis along the X axis, wherein
in the movable body, an opening is provided, a supporter fixed to the substrate is provided, the supporter is arranged in the opening in a plan view from the Z-axis direction along the Z axis, and the supporter is coupled to the movable body by a coupler which spans the opening, and
in the plan view from the Z-axis direction, the movable body includes:
a plurality of first extensions respectively arranged at a plurality of predetermined angles with respect to the swing axis, the plurality of first extensions extending radially from the supporter toward outer edges of the movable body, the plurality of first extensions including at least two pairs of first extensions, with each pair of first extensions provided symmetrically with each other relative to the swing axis, and
a plurality of second extensions arranged so as to face the plurality of first extensions, each of the plurality of second extensions extending so as to be disposed between a respective adjacent pair of the plurality of first extensions, and
side surfaces of each of the plurality of second extensions oppose and face a respective side surface of the plurality of first extensions, with the opening disposed therebetween, and only the opening is disposed between the side surface of the second extension and the side surface of the first extension such that the side surface of the second extension is configured to contact the side surface of the first extension along a length of the first extension and the second extension, respectively, and not at a terminus of the first extension and the second extension, to close, in parallel to an extension direction of the first extension and the second extension, at least a portion of the opening therebetween to restrict displacement of the movable body when a predetermined in-plane rotation is applied, the length of the first extension and the second extension extending along the extension direction, which extends from a portion of the movable body defining an outer perimeter of the opening toward the supporter in the plan view from the Z-axis direction.

* * * * *